(12) United States Patent
Uchiyama

(10) Patent No.: US 8,672,306 B2
(45) Date of Patent: Mar. 18, 2014

(54) VEHICLE SHOCK ABSORBER

(75) Inventor: Mikio Uchiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 13/042,851

(22) Filed: Mar. 8, 2011

(65) Prior Publication Data

US 2011/0221108 A1 Sep. 15, 2011

(30) Foreign Application Priority Data

Mar. 9, 2010 (JP) ................................. 2010-051935

(51) Int. Cl.
*B60G 13/00* (2006.01)

(52) U.S. Cl.
USPC ........ 267/217; 188/282.4; 188/286; 188/297; 280/276

(58) Field of Classification Search
USPC ............... 267/217, 218, 219; 188/281, 282.4, 188/286, 287, 289, 297; 280/276, 279
See application file for complete search history.

(56) References Cited

U.S. PATENT DOCUMENTS

| 1,494,135 | A | * | 5/1924 | Robison et al. | 188/287 |
| 5,566,794 | A | * | 10/1996 | Wiard | 188/287 |
| 6,739,609 | B2 | * | 5/2004 | Miyabe | 280/276 |
| 6,883,650 | B2 | * | 4/2005 | van Wonderen et al. | 188/287 |
| 7,357,232 | B2 | * | 4/2008 | Fujita | 188/297 |
| 7,425,009 | B2 | * | 9/2008 | Namazue et al. | 280/279 |
| 7,740,263 | B2 | * | 6/2010 | Inaguma | 280/276 |
| 2002/0040833 | A1 | * | 4/2002 | Furuya | 188/322.22 |

FOREIGN PATENT DOCUMENTS

JP 2008-069830 A 3/2008

* cited by examiner

*Primary Examiner* — Pamela Rodriguez

(74) *Attorney, Agent, or Firm* — Birch, Stewart, Kolasch & Birch, LLP

(57) ABSTRACT

A vehicle shock absorber includes a plurality of communication holes axially provided side by side in a peripheral wall of the cylinder of the damper, another communication hole provided in a peripheral wall of the cylinder and located below a position of piston of the damper, and a third oil chamber provided in an outer tube and an inner tube of a fork body and outside the cylinder and communicating with only a second oil chamber via the communication holes. This configuration enables the vehicle shock absorber to make a damping force generated by the damper positional dependent, and suppresses the entering of an air bubble into the cylinder, even when a cylinder of the damper is located above an oil level in an oil reservoir within the absorber body.

18 Claims, 7 Drawing Sheets

VEHICLE SHOCK ABSORBER

CROSS-REFERENCE TO RELATED APPLICATION

The present application claims priority under 35 U.S.C. §119 to Japanese Patent Application No. 2010-051935, filed Mar. 9, 2010, the entire contents of which are hereby incorporated by reference.

BACKGROUND OF THE INVENTION

1. Field of the Invention

The invention relates to a hydraulic shock absorber for absorbing oscillations due to irregular road surface which are input to a wheel of a vehicle such as a motorcycle or the like.

2. Description of Background Art

Conventionally, a structure of a vehicle shock absorber is disclosed wherein damping force is made to have positional dependence (i.e., a characteristic of causing a damping force to change with a contraction position) by providing a plurality of axial holes in a cylinder of a rod type damper and changing the number of the holes according to the sliding position of a piston in the cylinder (for example, refer to JP-A No. 2008-69830).

The above structure allows an air bubble to enter the cylinder via the plurality of holes and, if applied to a front fork in which the cylinder is located above the level of oil in an oil reservoir within a shock absorber body, a hole made in the cylinder causes the oil to come out of the cylinder, which makes it impossible for a damping force to have positional dependence.

Accordingly, an object of the invention is to cause a damping force generated by a damper to have positional dependence even if the damper cylinder is located above the oil level in the oil reservoir within the shock absorber body of a vehicle shock absorber, and also to prevent an air bubble from entering the damper cylinder.

SUMMARY AND OBJECTS OF THE INVENTION

According to an embodiment of the present invention, a vehicle shock absorber includes a vehicle body side tube and an vehicle axle side tube (for example, an outer tube 31 and an inner tube 32 of an embodiment), both of which form a telescopic shock absorber body (for example, a fork body 23a of the embodiment); and a cylinder (for example, a cylinder 35 of the embodiment) which is inserted in one of the vehicle body side tube and the vehicle axle side tube, one end of which is attached to a bottom thereof (for example, an upper wall 31a of the embodiment and axially extends and the other end of which has a cap (for example, a cap 38 of the embodiment).

A rod (for example, a rod pipe 36 of the embodiment) is inserted in the other one of the vehicle body side tube and the vehicle axle side tube, one end of which is attached to a bottom thereof (for example, a lower wall 32a of the embodiment) and axially extends and the other end of which slidably passes through the cap of the cylinder and is inserted in the cylinder; and a piston (for example, a piston 37 of the embodiment) is attached to the other end of the rod and slides inside the cylinder according to expansion and contraction of the shock absorber body to generate a damping force using a resistance to flow of oil in the cylinder. A suspension spring (for example, a coil spring 34 of the embodiment) energizes a spring holder (for example, a spring holder 39 of the embodiment) fixed to the cylinder in the expansion direction of the shock absorber body. A first oil chamber (for example, a first oil chamber R1 of the embodiment) is formed outside the cylinder and act as an oil reservoir in the shock absorber body. A second oil chamber (for example, a second oil chamber R2 of the embodiment) is formed within the cylinder. A plurality of first oil communication holes axially provided side by side in a peripheral wall of the cylinder (for example, a communication hole 49b of the embodiment), a second oil communication hole (for example, communication hole 49a), and a third oil chamber (for example, a third oil chamber R3) which is provided outside the cylinder and communicates with the second oil chamber via the first and second oil communication holes are provided, and wherein the plurality of first oil communication holes are sequentially closed according to the position of the piston when the shock absorber body contracts and thereby the amount of working oil flowing out of the cylinder gradually decreases.

According to an embodiment of the present invention, a tubular member (for example, a tubular member 46 of the embodiment) is fixed to the outer circumference of the cylinder to form a double tube structure, and a space between an inner circumference of the tubular member and an outer circumference of the cylinder being the third oil chamber.

According to an embodiment of the present invention, one end of the tubular member (for example, a lower end 47 of the embodiment) has an oil seal (for example, an oil seal 47a of the embodiment) by which it closely liquid-tightly sticks to an outer circumference of the cylinder, and the other end (for example, an upper end 48 of the embodiment) is threadably mounted on an outer circumference of the cylinder.

According to an embodiment of the present invention, the tubular member is attached to the cylinder with the one end thereof abutting on or integrated with the spring holder.

According to an embodiment of the present invention, a convex portion (for example, a convex portion 52 of the embodiment) formed in at least one of an inner circumference of the tubular member and an outer circumference of the cylinder is provided in each of the first communication holes, not in the second communication holes in the third oil chamber.

According to an embodiment of the present invention, the tubular member has a diameter contraction portion and a diameter expansion portion (for example, a diameter contraction portion 3a and a diameter expansion portion 53b of the embodiment).

According to an embodiment of the present invention, the tubular member is formed so as to expand its diameter toward the extension direction of the shock absorber body.

According to an embodiment of the present invention, the second oil communication hole has a check valve.

According to an embodiment of the present invention, a sub tank oil chamber (for example, a sub tank oil chamber R5 of the embodiment) is provided at an end of the cylinder on the opposite side of the rod to become a damper for the oil amount corresponding to the rod by sliding of the piston. A base valve (for example, a sub piston 42 of the embodiment) is attached to an end of the cylinder to creates flow resistance to an oil flow between the second oil chamber and the sub tank oil chamber. A free piston (for example, a free piston 43 of the embodiment) is slidably installed in the sub tank to divide between a base valve side sub tank oil chamber and an opposite sub tank air chamber (for example, a sub tank air chamber R5' of the embodiment).

A guide rod (for example, a guide rod 51 of the embodiment) is provided at the center in the sub tank to become a slide shaft of the free piston and into which an adjust rod (for example, an adjust rod 51a of the embodiment) for adjusting a damping force is inserted. A pressure spring (for example, a pressure spring 44 of the embodiment) is provided in the sub tank air chamber to press the free piston toward the sub tank oil chamber; and a blow hole (for example a blow hole 45 of the embodiment) blows oil by communicating between the sub tank oil chamber and the first oil chamber outside the cylinder when the free piston performed a predetermined stroke with an increase of the oil volume in the second oil chamber.

The advantageous effects of the invention include the following:

According to an embodiment of the present invention, when the piston slides inside the cylinder with the contraction of the shock absorber body, a high pressure oil above the piston in the second oil chamber generates a damping force due to flow resistance to the piston and also the oil is extruded from the plurality of first oil communication holes to the third oil chamber to adjust the damping force. Also, when contraction of the shock absorber progresses the piston passes through the plurality of first oil communication holes sequentially, so that the number of the first oil communication holes above the piston decreases, thus allowing the damping force to change with the position of the piston. Further, since each first oil communication hole formed in a peripheral wall of the cylinder communicates with the second oil chamber and the third oil chamber, it is possible to prevent an air bubble from entering the cylinder from the each first oil communication holes.

According to an embodiment of the present invention, it is possible to easily form the third oil chamber and also compactly form the shock absorber body.

According to an embodiment of the present invention, it is possible to easily mount the tubular member.

According to an embodiment of the present invention, even if a pressure in the third oil chamber increases the tubular member is supported by the spring holder and thus it is possible to prevent a sealing performance deterioration due to flexure or the like. It is also possible to reduce the number of parts by integrating the spring holder and the tubular member.

According to an embodiment of the present invention, since oil enters the third oil chamber through the first oil communication holes and is returned again to the cylinder through the second oil communications hole, it is possible to generate a flow resistance by narrowing the flow passage with a convex member and thereby generate a damping force.

According to an embodiment of the present invention, it is possible to generate a flow resistance by narrowing an oil passage in the third oil chamber with the contracted diameter portion and the diameter expansion portion and thereby generate a damping force.

According to an embodiment of the present invention, by increasing a damping force until the shock absorber almost totally contracts, it is possible to mitigate the total contraction impact.

According to an embodiment of the present invention, it is possible to adjust an oil flow from the third oil chamber to the second oil chamber and thereby adjust the intensity of a damping force.

According to an embodiment of the present invention, in a cartridge-type inverted shock absorber wherein the cylinder is disposed on the upper side and the second oil chamber in the cylinder is located at a position higher than the first oil reservoir of the first oil chamber outside the cylinder, it is possible to cause a damping force to have positional dependence.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a partial cross-sectional view of a third modification example of the substantial part of the front fork; and.

DETAILED DESCRIPTION OF THE PREFERRED EMBODIMENTS

An embodiment of the invention is described below with reference to the drawings. Note that the directions such as front, back, left, and right used in the descriptions are the same as the direction of a vehicle unless otherwise noted. Also, arrows FR and UP used in the figures designate the front and upper sides of a vehicle respectively.

Figure 1:
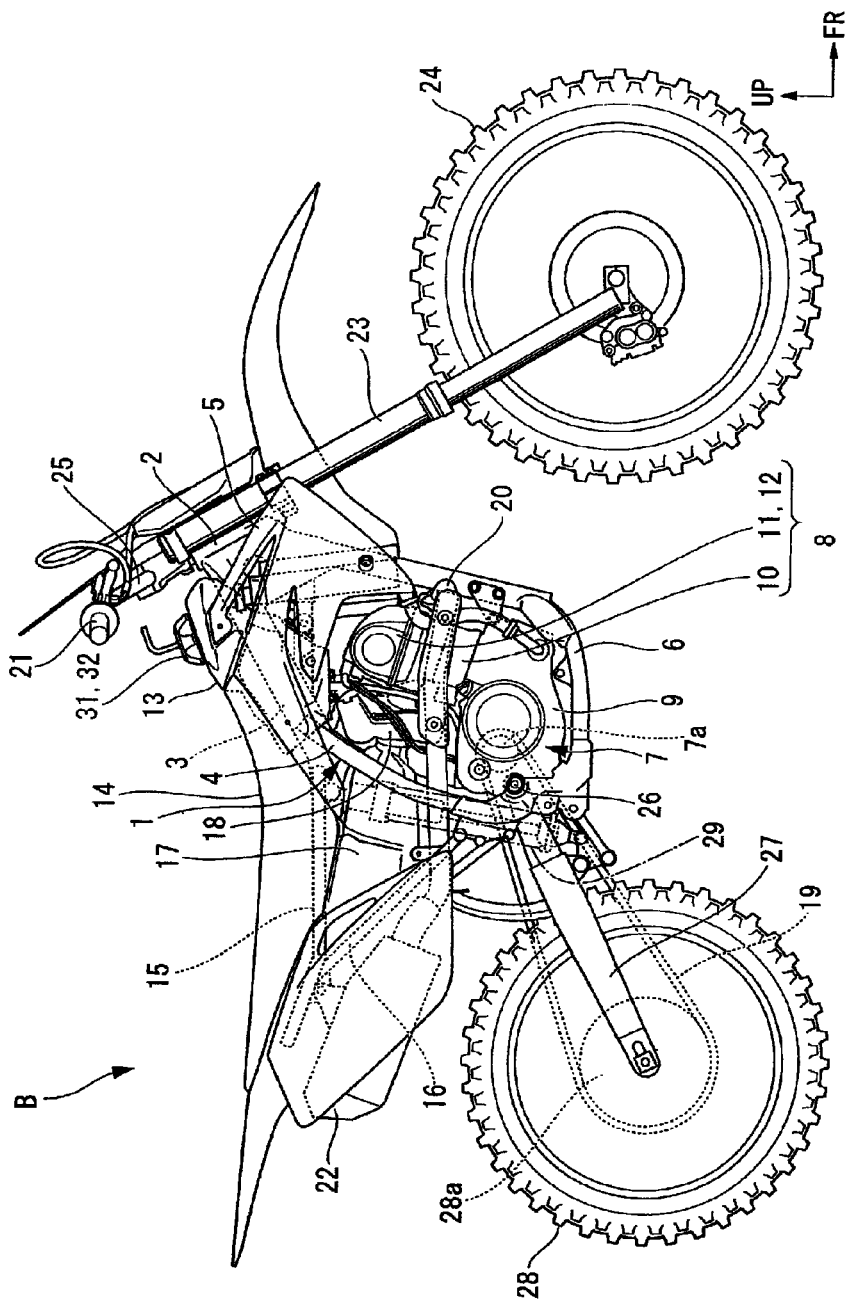
FIG. 1 is a right side view of a motorcycle of an embodiment of the invention.

A vehicle body frame 1 of a motorcycle shown in FIG. 1 includes a head pipe 2, a main frame 3, a center frame 4, a down frame 5, and a lower frame, which are joined together in a loop configuration so as to support an engine 7 inside. The engine 7 includes a cylinder 8 and a crankcase 9.

The main frame 3 extends straight downward and rearward in the center of the vehicle body above the engine 7, and connects to upper ends of the pair of left and right center frames 4 extending behind a fuel tank 13 and the engine 7. The down frame 5 extends straight downward obliquely in the center of the vehicle body in front of the engine 7, and connects to front ends of the pair of left and right lower frames 6 at an lower end thereof. The each lower frame 6 extends rearward from a lower front portion of the engine 7 in a curve and substantially straight, and a rear end thereof connects to a lower end of the each center frame 4.

The engine 7 is of a water-cooled type and the cylinder 8 is provided at a front of the crankcase 9 in an upright posture where a cylinder axis line thereof becomes substantially perpendicular, and includes a cylinder block 10, a cylinder head 11, and a head cover 12 from bottom up in this order. By making the cylinder 8 upright, longitudinal length of the engine 7 is shortened and thereby the engine 7 has a configuration suitable for an off-road vehicle.

Above the engine 7, there is the fuel tank 13 which is supported by the main frame 3. A seat 14 is disposed immediately behind the fuel tank 13 and supported by a seat rail 15 extending rearward from an upper end of the center frame 4. A rear frame 16 is disposed below the seal rail 15. The seat rail 15 and the rear frame 16 support an air cleaner 17 which performs an air intake from the rear side of a vehicle to the cylinder head 11. In front of the cylinder head 11, an exhaust pipe 20 stretches out and turns back on the right side of the cylinder 8 and connects its rear end to a muffler 22.

The head pipe 2 supports the front fork 23 and a front wheel 24 supported at a lower end thereof is steered with a handlebar 25. Left and right ends of the handlebar 25 have grips 21, the right grip 21 being a throttle grip. The center frame 4 slidably supports a front end of a rear swing arm 27 by means of a pivot shaft 26.

A rear wheel 28 is supported at a rear end of the rear swing arm 27 and is driven by a drive chain 19 wound on a drive sprocket 7a of the engine 7 and a driven sprocket 28a of the rear wheel 28. The drive chain 19 is installed laterally along the rear swing arm 27 on the left side of the vehicle body and moves up and down according to up and down movements of the rear swing arm 27 around the pivot axis 26. Also, a cushion unit 29 of a rear suspension is provided between the rear swing arm 27 and a rear end of the center frame 4.

Figure 2:
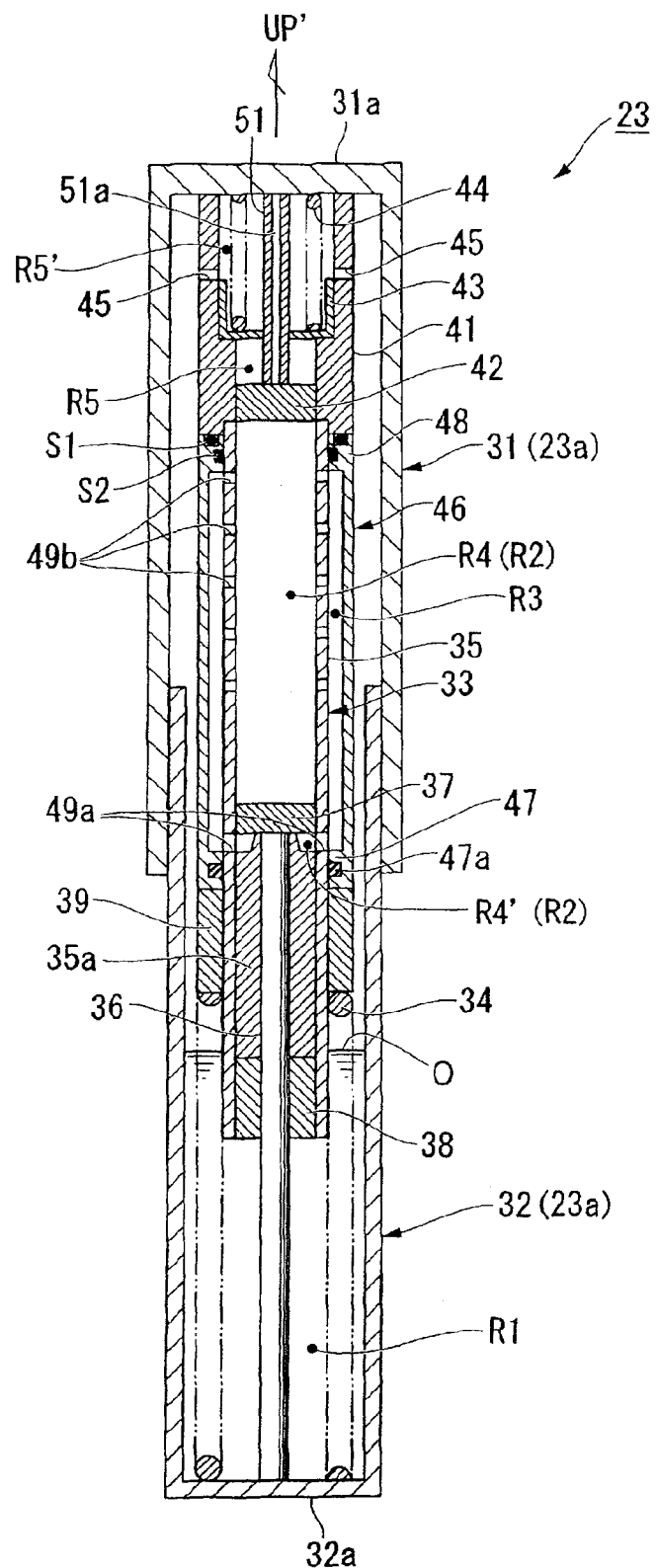
FIG. 2 is an axial cross-sectional view of a front fork of the motorcycle.

FIG. 2 is a schematic view of one of the left and right front forks 23 as a front suspension of the motorcycle B and the one of the front forks 23 is described below, the left and right front forks being configured symmetrically to each other. Note that the arrow UP' in the figure designates an axial upward direction (an expansion and contraction direction) of the front fork 23.

The front fork 23 forms an inverted telescopic fork body 23a with an outer tube 31 being disposed on an upper side and an inner tube 32 on a lower side. The outer tube 31 is cylindrical and the upper portion thereof is fixed to the vehicle body (steering system) and the also cylindrical inner tube 32 is axially slidably inserted from the lower portion thereof concentrically and via an oil seal or the like. Within the front fork 23, a rod-type damper 33 as a damping mechanism and a coil spring 34 as a suspension spring are each accommodated concentrically.

The damper 33 includes a tubular cylinder 35 extending downward from an upper wall 31a (a bottom) of the outer tube 31, a bar-like rod pipe 36 extending upward from a lower wall 32a (a bottom) of the inner tube 32 and inserted in the cylinder 35, and a piston 37 fixed on an upper end (a tip) of the rod pipe 36. That is, the damper 33 is of inverted type with the cylinder 35 on the upper side and the rod pipe on the lower side. To a lower end of the cylinder 35, a cylindrical and bottomed cap 38 for closing it is attached and the rod pipe 36 is inserted and held in the cap 38.

A spring holder 39 is fixed to the outer circumference of the lower end of the cylinder 35 and an upper end of the coil spring 34 abuts on and is supported by the lower end of the spring holder 39 and the lower end of the coil spring 34 abuts on and is supported by the lower wall 32a of the inner tube 32. In this state, an axial elongational energizing force acts between the spring holder 39, consequently the cylinder 35 (the outer tube 31), and a rod pipe 36 (the inner tube 32).

Since the piston 37 reciprocates inside the oil (working oil)-filled cylinder 35, an inner space of the cylinder 35 is divided into a rod-side oil chamber R4' below the piston 37 and a cylinder-side oil chamber R4 above the piston 37. Hereafter, the oil chambers R4 and R4' may be collectively referred to as a second oil chamber (an in-cylinder oil chamber) R2. The piston 37 is provided with an elongation-side valve and a compression-side valve (not shown) which allow a communication between the rod-side oil chamber R4' and the cylinder-side oil chamber R4. In the lower portion of the cylinder 35, a regulation member 35a is provided which regulates a position of the piston 37 when the damper 33 totally extended.

To the upper end of the cylinder 35, the cylindrical sub tank 41 is coaxially attached and the upper end of the cylinder 35 is supported by the upper wall 31a of the outer tube 31 via the sub tank 41. A sub piston 42 is fixed and held on a lower end of the sub tank 41. The free piston 43 is inserted into the sub tank 41, and a space below the free piston 43 is a sub tank oil chamber R5 and a space above the free piston 43 is a sub tank air chamber R5'. In the center of the sub tank 41, a guide rod 51 is provided to insert therein an adjust rod 51a which acts as a slide shaft of the free piston 43 and adjusts a damping force inside.

The free piston 43 is energized toward the sub piston 42 from behind (the side of the sub tank air chamber R5' above it) by a spring force of the pressure spring 44. This pressurizes the sub tank oil chamber R5 to a predetermined pressure. The sub piston 42 has a compression-side damping valve (not shown) which allows a communication between the cylinder-side oil chamber R4 and the sub tank oil chamber R5 above it.

If surplus oil is filled in the sub tank oil chamber R5, the free piston 43 moves back (moves up) under oil pressure and opens the blow hole 45 made in the circumference of the upper end of the cylinder 35 to cause the surplus oil to flow out into the first oil chamber (reservoir chamber) R1 inside the inner tube 32. Note that reference numeral 0 in the figure designates a level of the oil reserved in the first oil chamber R1 (inside the front fork 23).

In the above configuration, at the time of elongation action in which the piston 37 moves down inside the cylinder 35, a predetermined elongation damping force is generated by an elongation-side damping valve of the piston 37. On the other hand, at the time of contraction action in which the piston 37 moves up inside the cylinder 35, a predetermined compression-side damping force is generated, and also when surplus oil of the volume of the rod pipe 36 or the like flows into the sub tank oil chamber R5a predetermine compression-side damping force is generated by a compression-side damping valve of the sub piston 42. This compression-side damping force is stabilized by a timely pressurization of the sub tank oil chamber R5.

Figure 3:
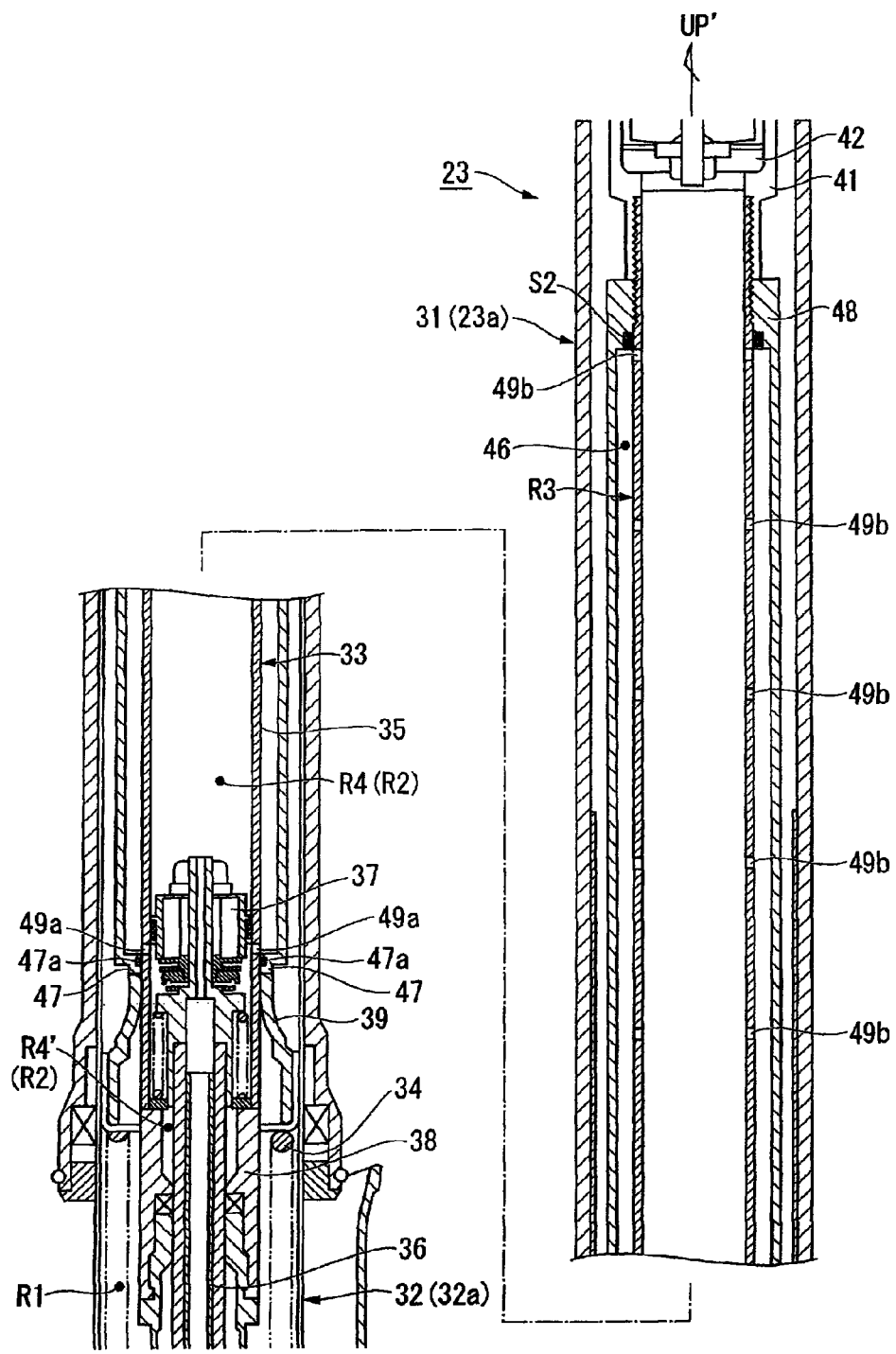
FIG. 3 is an axial cross-sectional view of a substantial part of the front fork.

Also with reference to FIG. 3, a cylindrical tubular member 46 forming a double-pipe structure is fixed to the outer circumference of the cylinder. The inner circumference of a lower end of the tubular member 46 is in close and liquid-tight contact with the outer circumference of the cylinder 35 via an oil seal 47a, and a lower end thereof abuts on an upper end of the spring holder 39. An upper end of the tubular member 46 may be integrated with the upper end of the spring holder 39 (i.e., they are formed integrally) and in this case the number of components can be reduced.

On the other hand, in the upper end 48 of the tubular member 46, a female screw graven in its inner circumference is threadably mounted on the outer circumference of an upper end of the cylinder. This allows the tubular member 46 to be fixedly mounted on the outer circumference of the cylinder 35. Also, the upper end of the tubular member 46 is in liquid-tight contact with the lower end of the sub tank 41 via an O-ring S2 at a position other than a threadably-mounting portion.

The inner circumference of the tubular member 46 forms a cylindrical space at a predetermined distance from the outer circumference of the cylinder, and the space becomes the third oil chamber R3 communicating with the second oil chamber R2 via later described communication holes 49a and 49b formed in the outer circumference of the cylinder 35.

When a surplus oil enters the sub tank oil chamber R5, the free piston 43 moves up due to a pressure of the oil, and if the surplus oil becomes more than a predetermined amount the free piston 43 moves up to open the blow hole 45 provided in the sub tank 41 and flows out the surplus oil into the first oil chamber R1 in the inner tube 32 through the blow hole 45. The blow hole 45 is provided with an unshown check valve (a flow volume adjusting valve).

In the outer circumference of a lower end of the cylinder 35, a communication hole (penetration hole) 49a is drilled which allows the communication between the rod-side oil chamber R4' of the cylinder 35 and the third oil chamber R3 outside the cylinder 35 and inside the tubular member 46. The communication hole 49a is located below a position of the piston 37 when the fork body fully extended.

Further, in the upper outer wall of the cylinder 35, a plurality of communication holes (penetration holes) 49b are drilled which open at appropriate intervals and allow the cylinder-side oil chamber R4 inside the cylinder 35 and the third oil chamber R3 outside the cylinder 35 and inside the tubular member 46.

The damper 33 generates a damping force according to a movement speed of the piston 37 by means of a damping valve of the piston 37 but also has a position-dependent damping function of generating a damping force according to a movement position of the piston 37.

Specifically, at the time of contraction action in which the piston 37 moves up inside the cylinder, oil in the cylinder-side oil chamber R4 flows out into the third oil chamber R3 through each communication hole 49b. At this time, when the piston 37 moves up in the cylinder 35, the number of communication holes 49b through which the oil in the cylinder-side oil chamber R4 flows out decreases sequentially starting from the lowest hole, thus generating a contraction-dependent resistance to an outflow of the oil in the cylinder-side oil chamber R4 to the third oil chamber R3.

That is, when a contraction stroke of the front fork 23 is long, as the contraction progresses a squeezing resistance generated in each communication hole 49b increases, thus realizing a position-dependent damping characteristic of increasing a damping force according to contraction position. The oil flowing out to the third oil chamber R3 flows into the rod-side oil chamber R4' via the communication hole 49a, but because of a check valve (a flow volume adjusting valve) provided in the communication hole 49a a compression-side damping force is generated also in the communication hole 49a.

On the other hand, during an elongation action in which the piston 37 moves down inside the cylinder 35, oil in the rod-side oil chamber R4' flows out into the third oil chamber R3 through the communication hole 49a. At this time, oil in the third oil chamber R3 flows into the cylinder-side oil chamber R4 through each communication hole 49b after the piston moved down and the communication holes 49b open sequentially starting from the highest hole, thus generating an elongation position-dependent resistance to a flow of oil into the cylinder-side oil chamber R4. The oil in the rod-side oil chamber R4' flows out into the third oil chamber R3 via the communication hole 49a and at this time an elongation-side damping force is generated. Also, by providing a check valve (one way valve) above the communication holes 49a in the third oil chamber R3 to close an elongation-side flow passage, an elongation-side damping force can also be generated.

As described above, in the vehicle shock absorber of the above embodiment including: the outer tube 31 and the inner tube 32 forming the telescopic fork body 23a; a cylinder 35 which is provided in one of the outer tube 31 and the inner tube 32, one end thereof being attached to the bottom (upper wall 31a) of the one of the tubes and extending axially and the other end having the cap 38; a rod pipe 36 which is provided in the other one of the outer tube 31 and the inner tube 32, one end thereof being attached to the bottom (lower wall 32a) of the other one and extending axially and the other end slidably penetrating through the cap 38 of the cylinder 35; the piston 37 which is attached to the other end of the rod pipe 36 and slides in the cylinder 35 according to elongation and contraction of the fork body 23a to generate a damping force using a flow resistance of oil in the cylinder 35; a coil spring 34 which energizes the spring holder 39 fixed on the cylinder 35 in the elongation direction of the fork body 23a; a first oil chamber R1 which is formed outside the cylinder 35 to become an oil reservoir at a lower part of the fork body 23a; and a second oil chamber R2 which is formed inside the cylinder 35, wherein: a plurality of communication holes 49b axially provided side by side in a peripheral wall of the cylinder 35, a communication hole 49a provided in a peripheral wall of the cylinder 35 and is located lower than a position of the piston 37 when the fork body 23a fully extended, and a third oil chamber R3 provided inside the outer tube 31 and the inner tube 32 and outside the cylinder 35 and communicating only with the second oil chamber R2 via the communication holes 49a and 49b are provided.

According to this configuration, when the piston 37 slides in the cylinder 35 with a contraction of the fork body 23a, a high-pressure oil in the second oil chamber R2 above the piston 37 generates a damping force using a flow resistance to the piston 37 and also causes the oil to flow out into the third oil chamber R3 through the plurality of communication holes 49b. Further, as contraction of the fork body 23a progresses the piston 37 passes the plurality of communication holes 49b sequentially and thereby the number of the communication holes 49b decreases, thus making it possible to change a damping force according to a position of the piston 37. Also, since each hole 49b formed in the peripheral wall of the cylinder 35 communicates between the second oil chamber R2 and the third oil chamber R3, it is possible to prevent entering an air bubble through the each hole 49b.

Further, in the above vehicle shock absorber, the tubular member 46 is provided that is fixed on the circumference of the cylinder 35 to form a double tube structure and thereby a space between the inner circumference of the tubular member 46 and the outer circumference of the cylinder 35 become the third oil chamber R3, thus making it possible to easily form the third oil chamber R3 and also form the fork body 23a compactly.

Also, in the above vehicle shock absorber, one end (a lower end 47) of the tubular member 46 has an oil seal and closely and liquid-tightly sticks to the outer circumference of the cylinder through it and the other end (an upper end 48) is threadably mounted on the outer circumference of the cylinder 35, thus making it easy to mount the tubular member 46.

Further, in the above vehicle shock absorber, since the tubular member 46 is attached to the cylinder 35 with the one end 47 thereof abutting on the spring holder 39, the tubular member 46 is supported by the spring holder 39 even if a pressure in the third oil chamber R3 goes high.

Also, in the above vehicle shock absorber, since a check valve is provided in the communication hole 49a, an oil flow from the third oil chamber R3 to the second oil chamber R2 can be adjusted, thus making it possible to adjust the intensity of a damping force.

Further, since the above vehicle shock absorber includes: a sub tank 41 that is provided on an end of the cylinder 35 opposite to the rod pipe 36 and forms a sub tank oil chamber R5 that becomes a damper for an oil volume of corresponding to the rod pipe 36 by sliding of the piston 37; a sub piston 42 which is attached to an end of the cylinder 35 and creates a flow resistance to a flow between the second oil chamber R2 and the sub tank oil chamber R5; a free piston 43 which is slidably mounted on the sub tank to divide between the sub tank oil chamber R5 on the sub piston 42 side and the sub tank air chamber R5' on the opposite side; a guide rod 51 which is provided in the center of the sub tank 41 to act as a slide shaft of the free piston 43 and in which an adjust rod 51a for adjusting a damping force is inserted; a pressure spring 44 which is provided in the sub tank air chamber R5' to press the free piston 43 toward the sub tank oil chamber R5; and a blow hole 45 which blows oil by communicating between the sub tank oil chamber R5 and the first oil chamber R1 outside the cylinder 35 when the free piston 43 performed a predetermined stroke due to an increase in the amount of oil in the second oil chamber R2, the cylinder 35 is disposed on the upper side and also, in a cartridge-type inverted shock absorber wherein the second oil chamber R2 in the cylinder 35 is located at a position higher than an oil reservoir of the first oil chamber R1, it is possible to make a damping force positional dependent.

Figure 4:
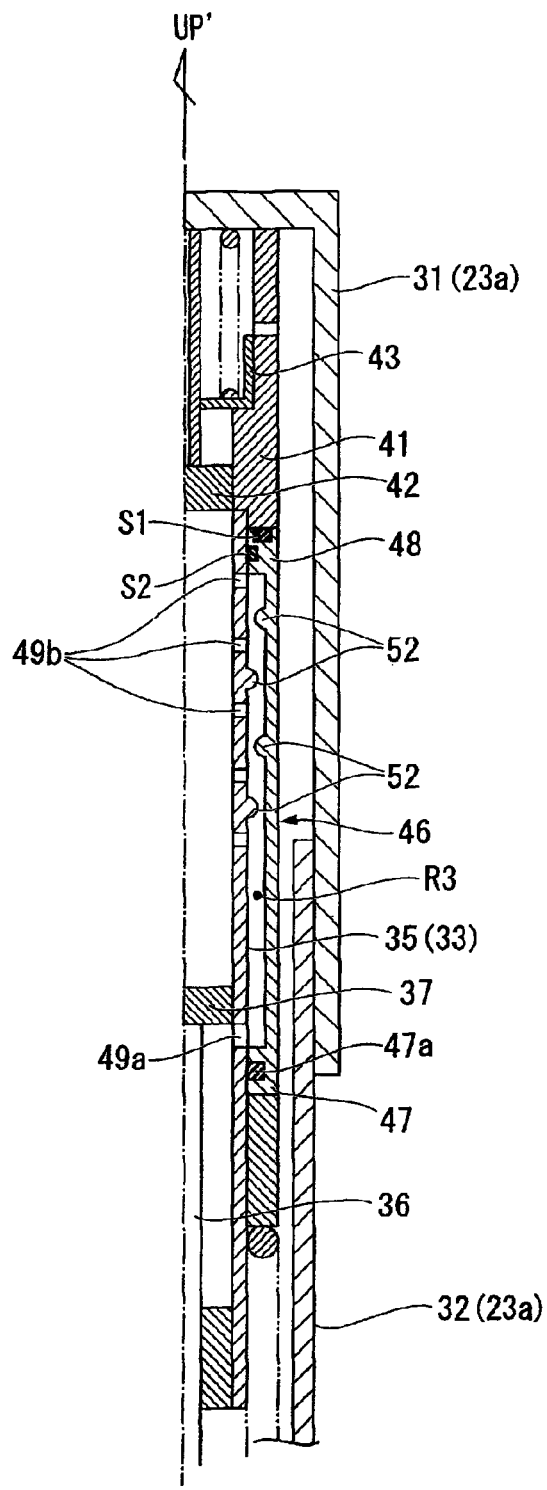
FIG. 4 is a partial cross-sectional view of a first modification example of the substantial part of the front fork.

The invention is not limited to the above embodiment and it is also possible to provide a convex portion formed in one of an inner circumference of the tubular member 46 and an outer circumference of the cylinder 35 on the side of the each communication hole 49b rather than the communication hole 49a in the third oil chamber R3, as shown in FIG. 4.

According to this configuration, for the oil entering the third oil chamber R3 via the communication hole 49b and returning again to the cylinder 35 via the communication hole 49a, by generating a flow resistance to the oil in the third oil chamber R3 with the convex portion 52, it is possible to further increase a damping force.

Figure 5:
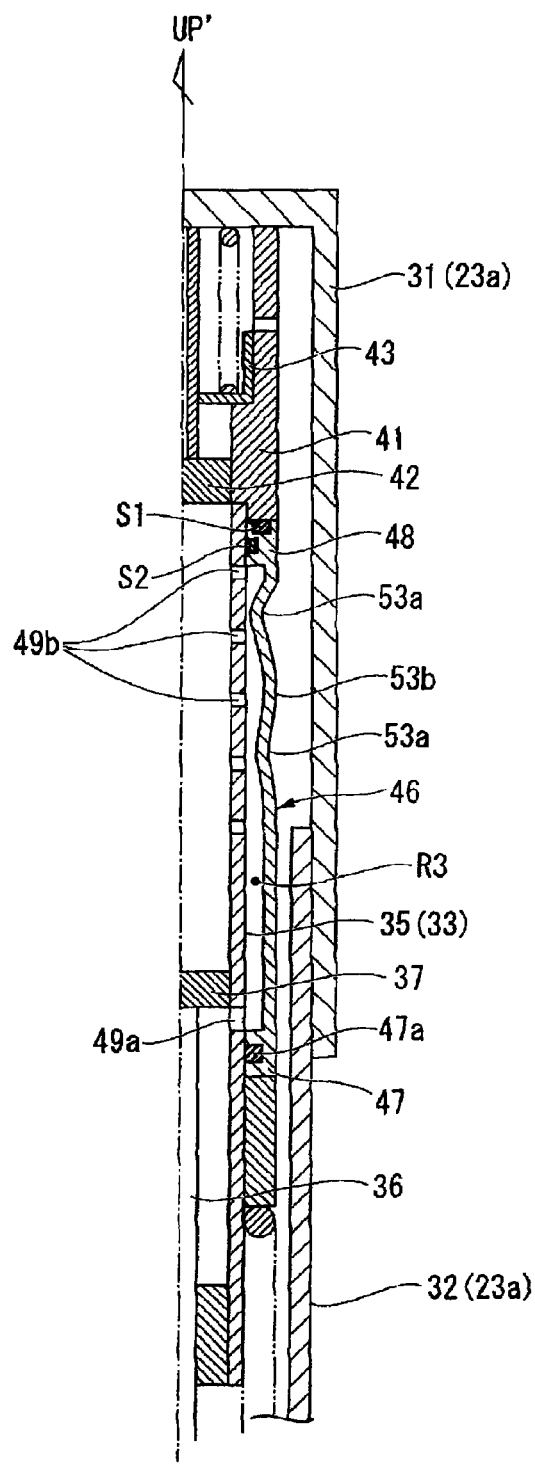
FIG. 5 is a partial cross-sectional view of a second modification example of the substantial part of the front fork.

Likewise, as shown in FIG. 5, since the diameter contraction portion 53a and the diameter expansion portion 53b are provided; it is possible to generate a flow resistance by narrowing a flow passage in the third oil chamber R3 and thereby increase a damping force.

Figure 6:
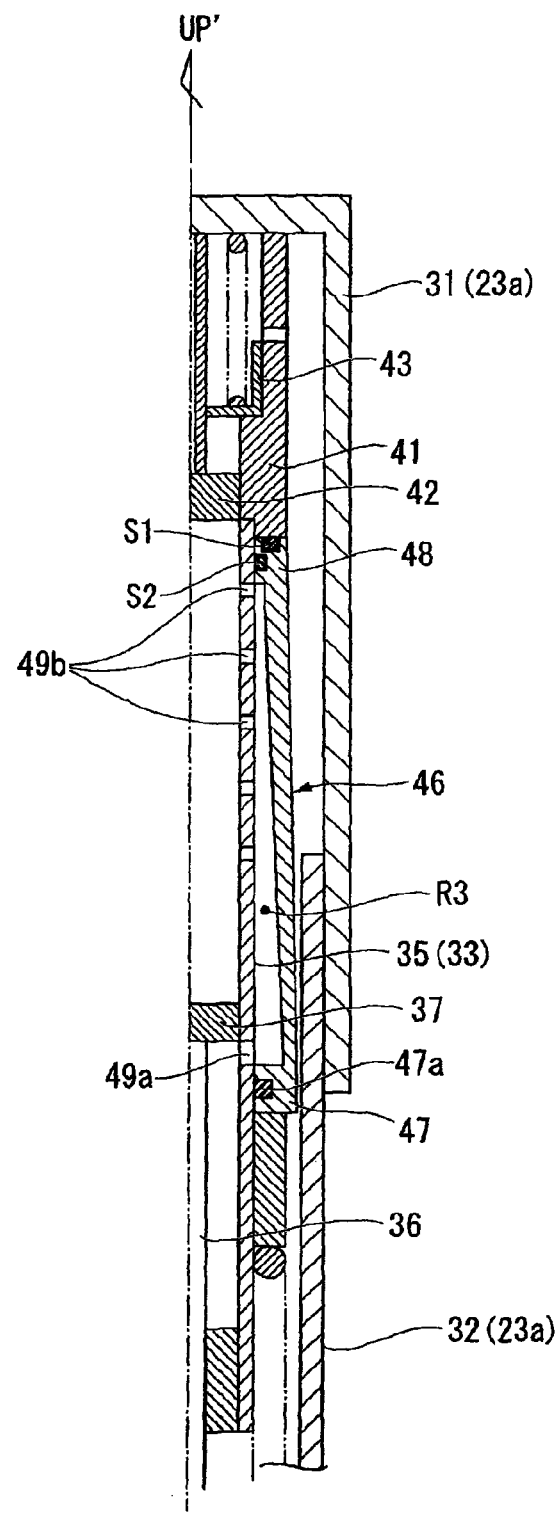

Further, as shown in FIG. 6, since the tubular member 46 is formed so as to increase its diameter toward the elongation direction of the fork body 23a, as the fork body 23a contracts almost to total contraction, a flow passage in the third oil chamber R3 narrows and a damping force increases, making it possible to mitigate the total contraction impact of the fork body 23a.

Figure 7:
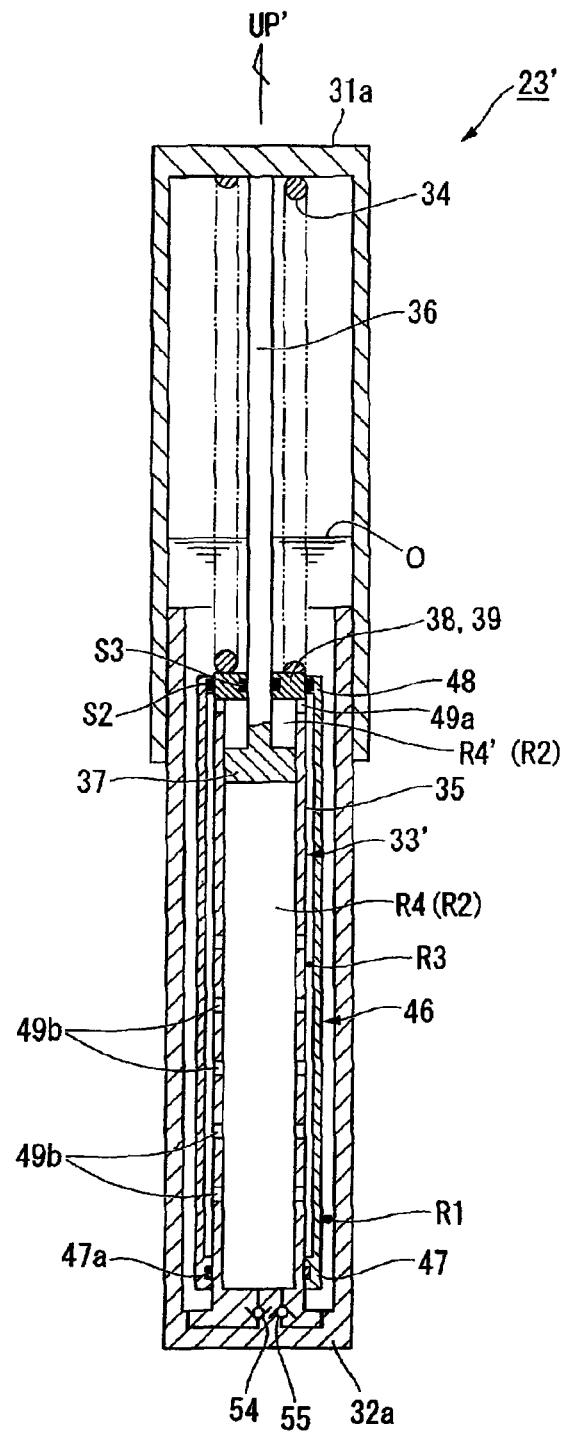
FIG. 7 is a cross-sectional view corresponding to FIG. 2 showing a fourth modification example of the front fork.

Also, as in the front fork 23' shown in FIG. 7, the invention can be applied to a configuration in which the cylinder 35 is fixed on the lower side (on the inner tube 32 side) and an erection-type damper 33' fixed on the upper end (the outer tube 31 side) of the rod pipe 36 is used. The oil level O of the oil in the front fork 23' is located inside the outer tube 31 and the upper end of the inner tube 32 submerges in the oil. The cap 38 of the damper 33' also serves as the spring holder 39 that supports the lower end of the coil spring 34. In the inner circumference of the cap 38, an O-ring S3 closely contacting the outer circumference of the rod pipe 36 is provided. In the lower end of the cylinder 35, a compression-side check valve 54 and an elongation-side check valve 55 are provided that allow a communication between the cylinder side oil chamber R4 and the first oil chamber R1. Note that the same reference numerals are used for the parts corresponding to those of the above embodiment in order to omit the descriptions.

Also the invention can be applied to an erection-type front fork in which the outer tube is disposed on the lower side (vehicle boy side) and the inner tube on the upper side (vehicle body side).

Further, the invention is suitable for an off-road motorcycle and a mountain bike-type bicycle and also can be applied to an on-road type vehicle as well as a three-wheeled vehicle and a four-wheeled vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle shock absorber comprising:
a vehicle body side tube and an vehicle axle side tube forming a telescopic shock absorber;
a cylinder which is provided in one of the vehicle body side tube and the vehicle axle side tube and one end thereof is attached to a bottom of the one of the tubes and axially extends, and
a cap is mounted on the other end thereof;
a rod which is provided in the other one of the vehicle body side tube and the vehicle axle side tube and one end thereof is attached to a bottom of the other tube and axially extends, and the other end slidably penetrates through the cap of the cylinder into the cylinder;
a piston which is attached to the other end of the rod and slides in the cylinder with a contraction and elongation of a shock absorber body to generate a damping force by a flow resistance of oil in the cylinder;
a suspension spring which energizes a spring holder fixed on the cylinder in an elongation direction of the shock absorber body;
a first oil chamber which is formed outside the cylinder and acts as an oil reservoir in the shock absorber body; and
a second oil chamber which is formed inside the cylinder, wherein the vehicle shock absorber further includes:
a plurality of first oil communication holes axially provided side by side in a peripheral wall of the cylinder;
a second oil communication hole; and
a third oil chamber provided outside the cylinder and communicating with the second oil chamber via the plurality of first oil communication holes and the second communication hole, and
wherein the plurality of first oil communication holes are sequentially closed according to a moving position of the piston in the cylinder during a contraction action of the shock absorber body and thereby a flow volume of a working oil from the cylinder gradually decreases; and
wherein the vehicle shock absorber has a tubular member which is fixed to an outer circumference of the cylinder to form a double tube structure and a space between an inner circumference of the tubular member and the outer circumference of the cylinder is the third oil chamber.

2. The vehicle shock absorber according to claim 1, wherein the tubular member has an oil seal at an end thereof and closely and liquid-tightly sticks to the outer circumference of the cylinder, and the other end is threadably mounted on the outer circumference of the cylinder.

3. The vehicle shock absorber according to claim 2, wherein the tubular member is attached to the cylinder with the one end thereof abutting on or integrated with the spring holder.

4. The vehicle shock absorber according to claim 2, wherein a convex portion formed in at least one of an inner circumference of the tubular member and an outer circumference of the cylinder is provided adjacent to each of the first oil communication holes rather than adjacent to the second oil communication hole in the third oil chamber.

5. The vehicle shock absorber according to claim 2, wherein the tubular member is provided with a diameter contraction portion and a diameter expansion portion.

6. The vehicle shock absorber according to claim 2, wherein the tubular member is formed so as to expand in diameter in the elongation direction of the shock absorber body.

7. The vehicle shock absorber according to claim 2, wherein the second oil communication hole is provided with a check valve.

8. The vehicle shock absorber according to claim 2, further comprising:
- a sub tank which is provided in an end of the cylinder opposite to the rod to form a sub tank oil chamber which becomes a damper with oil volume of the rod by sliding of the piston;
- a base valve which is attached to an end of the cylinder to create a flow resistance to an oil flow between the second oil chamber and the sub tank oil chamber;
- a free piston which is slidably attached in the sub tank to divide between a base valve side sub tank oil chamber and an opposite side sub tank air chamber;
- a guide rod which is provided in a center of the sub tank and acts as a slide shaft of the free piston and into which an adjust rod for adjusting a damping force is inserted;
- a spring which is provided in the sub tank air chamber to press the free piston toward the sub tank oil chamber; and
- a blow hole which communicates between the sub tank oil chamber and the first oil chamber outside the cylinder to blow oil when the free piston performed a predetermined stroke with an increase of oil volume in the second oil chamber.

9. The vehicle shock absorber according to claim 1, wherein the tubular member is attached to the cylinder with the one end thereof abutting on or integrated with the spring holder.

10. The vehicle shock absorber according to claim 9, wherein a convex portion formed in at least one of an inner circumference of the tubular member and an outer circumference of the cylinder is provided adjacent to each of the first oil communication holes rather than adjacent to the second oil communication hole in the third oil chamber.

11. The vehicle shock absorber according to claim 9, wherein the second oil communication hole is provided with a check valve.

12. The vehicle shock absorber according to claim 1, wherein a convex portion formed in at least one of an inner circumference of the tubular member and an outer circumference of the cylinder is provided adjacent to each of the first oil communication holes rather than adjacent to the second oil communication hole in the third oil chamber.

13. The vehicle shock absorber according to claim 1, wherein the tubular member is provided with a diameter contraction portion and a diameter expansion portion.

14. The vehicle shock absorber according to claim 1, wherein the tubular member is formed so as to expand in diameter in the elongation direction of the shock absorber body.

15. The vehicle shock absorber according to claim 1, wherein the second oil communication hole is provided with a check valve.

16. The vehicle shock absorber according to claim 1, further comprising:
- a sub tank which is provided in an end of the cylinder opposite to the rod to form a sub tank oil chamber which becomes a damper with oil volume of the rod by sliding of the piston;
- a base valve which is attached to an end of the cylinder to create a flow resistance to an oil flow between the second oil chamber and the sub tank oil chamber;
- a free piston which is slidably attached in the sub tank to divide between a base valve side sub tank oil chamber and an opposite side sub tank air chamber;
- a guide rod which is provided in a center of the sub tank and acts as a slide shaft of the free piston and into which an adjust rod for adjusting a damping force is inserted;
- a spring which is provided in the sub tank air chamber to press the free piston toward the sub tank oil chamber; and
- a blow hole which communicates between the sub tank oil chamber and the first oil chamber outside the cylinder to blow oil when the free piston performed a predetermined stroke with an increase of oil volume in the second oil chamber.

17. The vehicle shock absorber according to claim 1, wherein the third oil chamber outside the cylinder has a width which is different at different points along a length of the cylinder.

18. The vehicle shock absorber according to claim 17, wherein the tubular member has an oil seal at an end thereof and closely and liquid-tightly sticks to the outer circumference of the cylinder, and the other end is threadably mounted on the outer circumference of the cylinder.

* * * * *